Oct. 1, 1968
A. L. LEE ETAL
3,403,797
FLEXIBLE SHUTTLE CAR
Filed Oct. 11, 1965
8 Sheets-Sheet 1
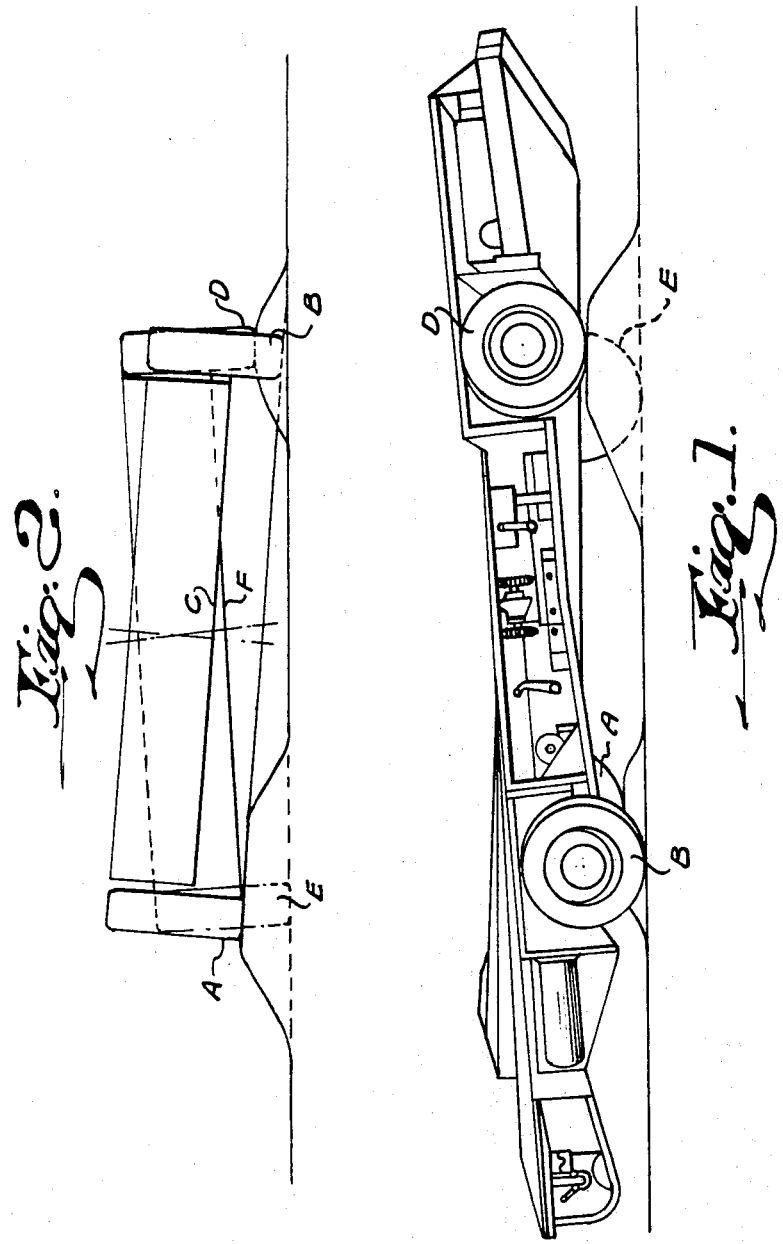
INVENTORS.
ARTHUR L. LEE,
ARTHUR B. COVAL.
BY Stanley J Price
their
ATTORNEY.

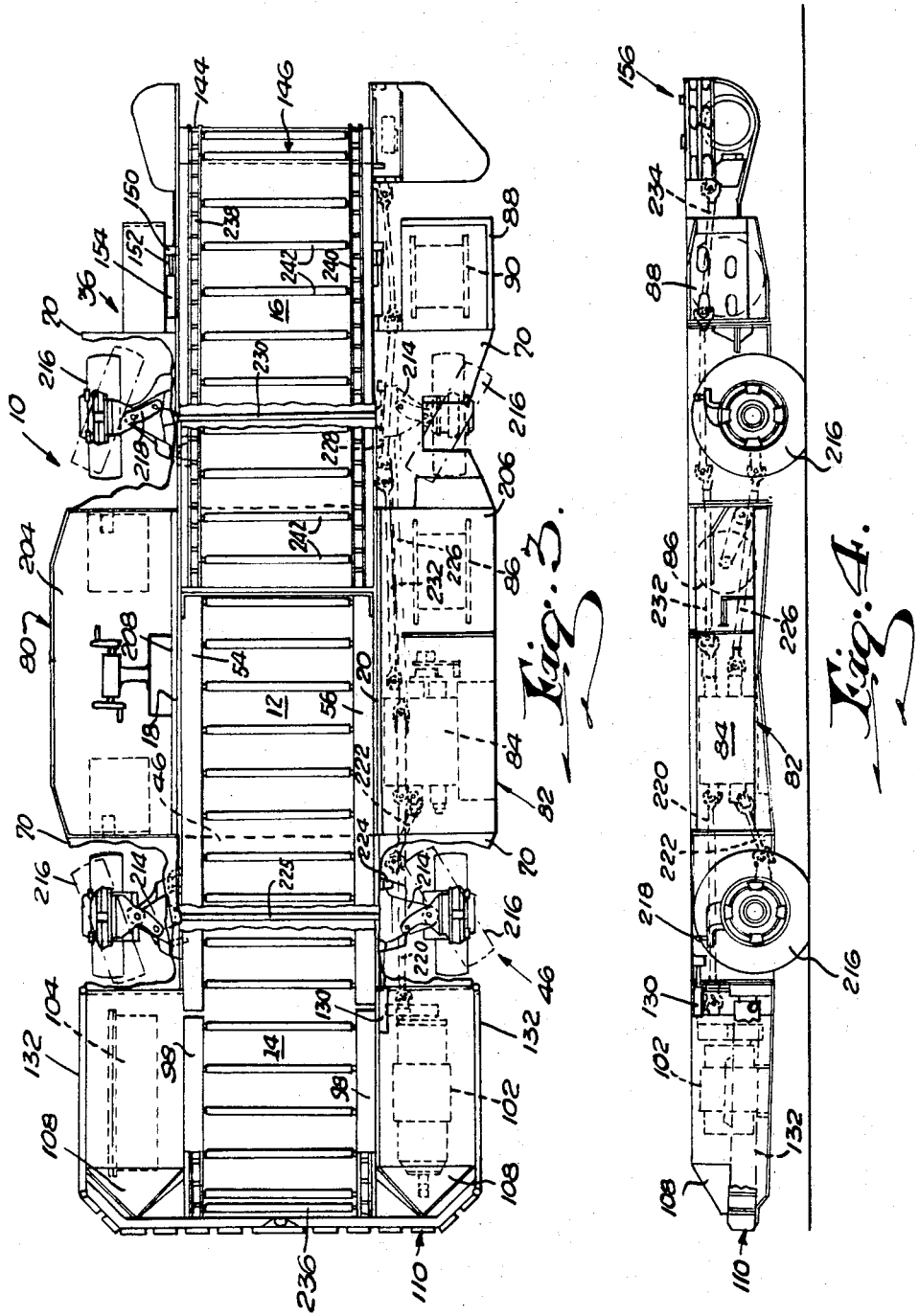

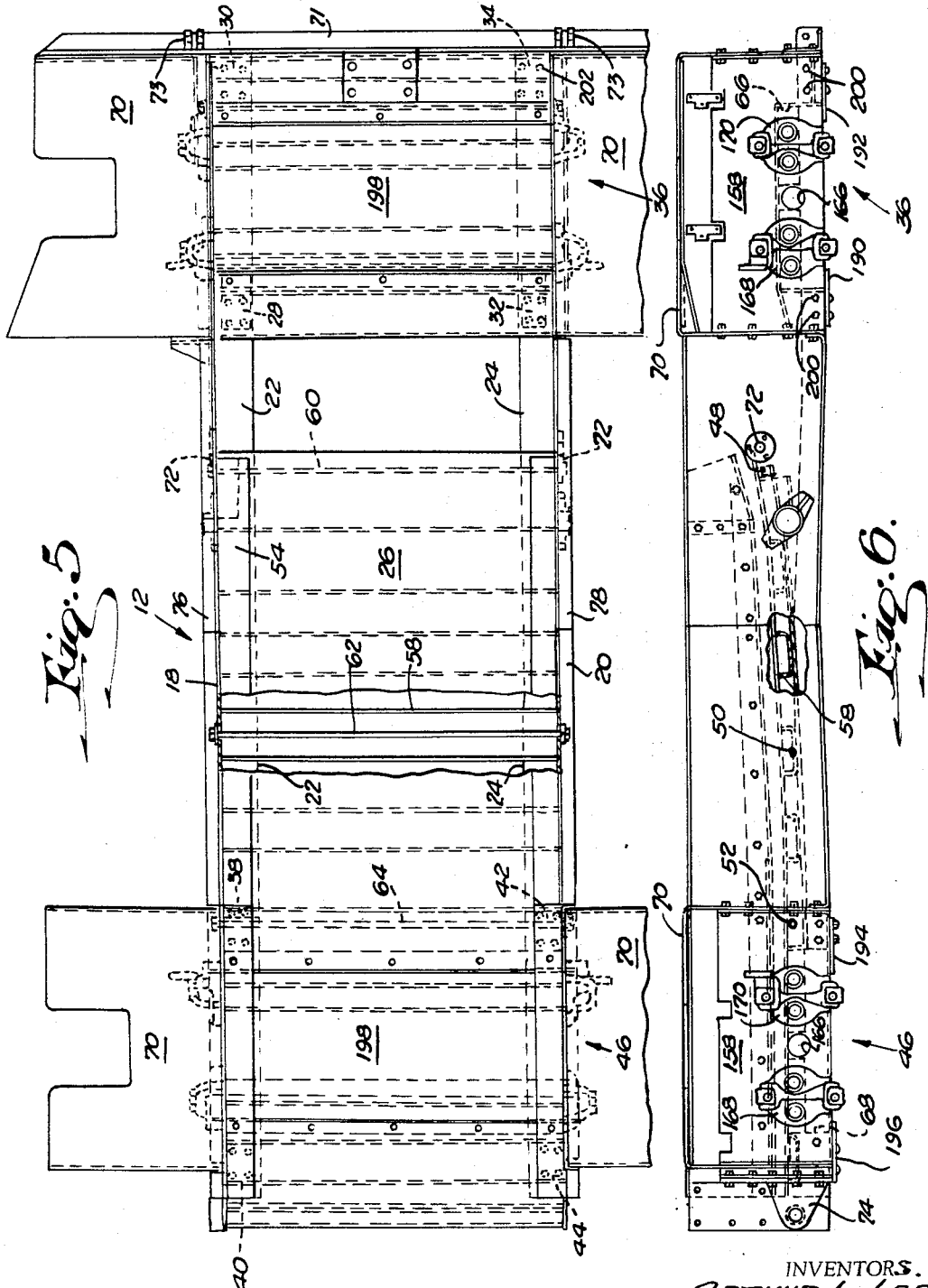

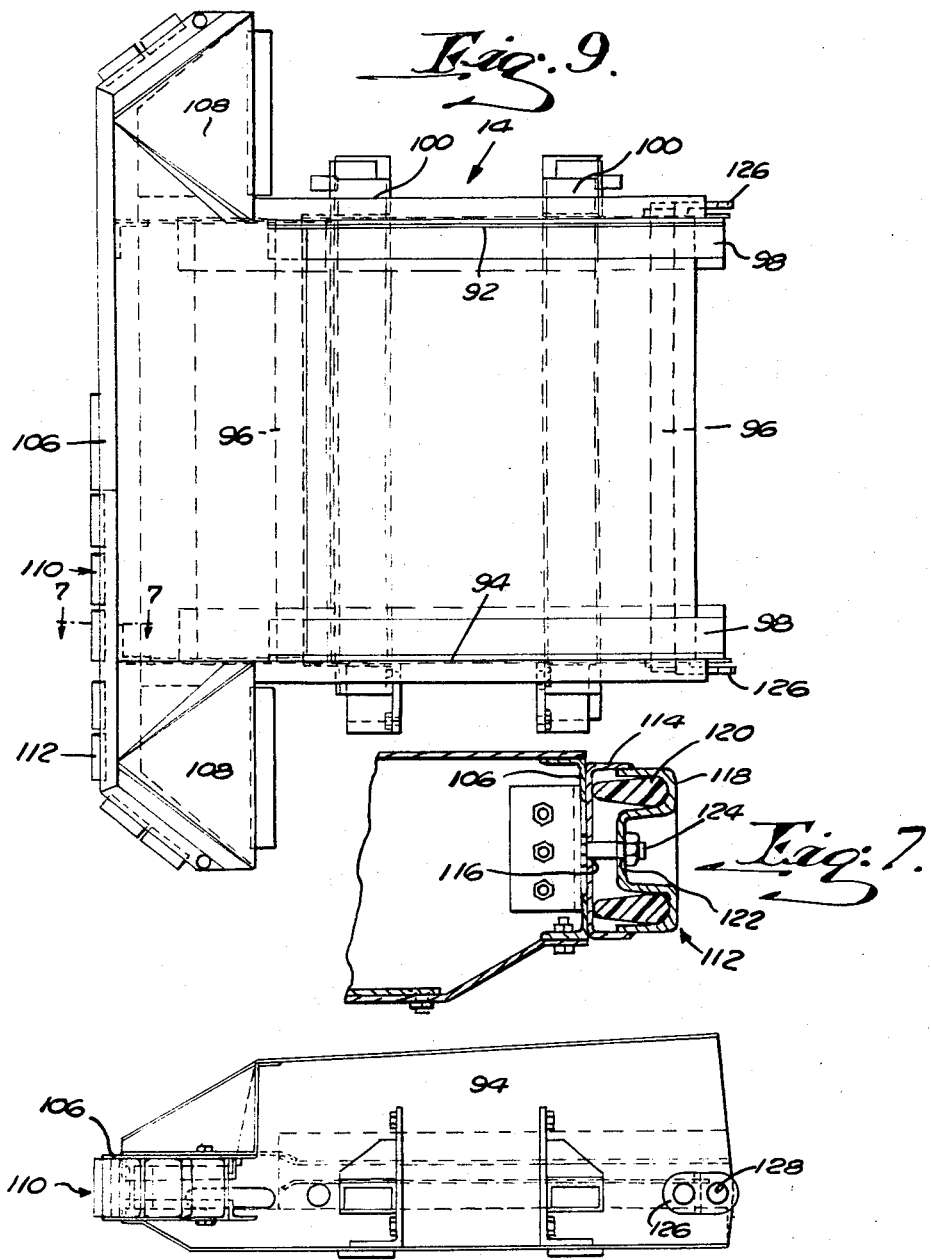

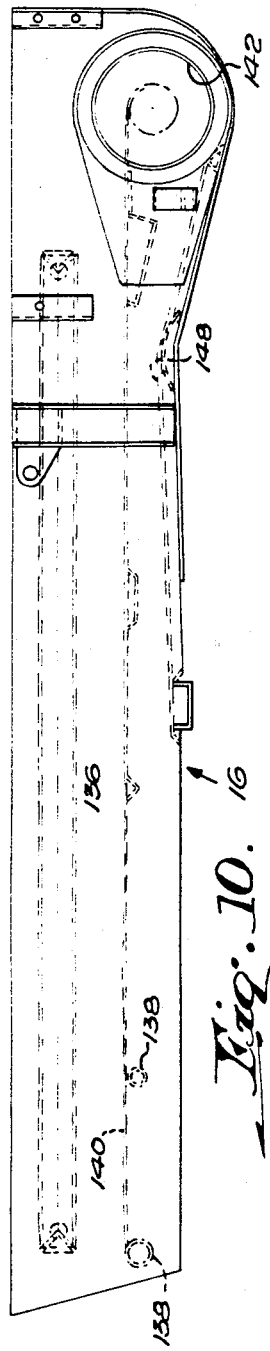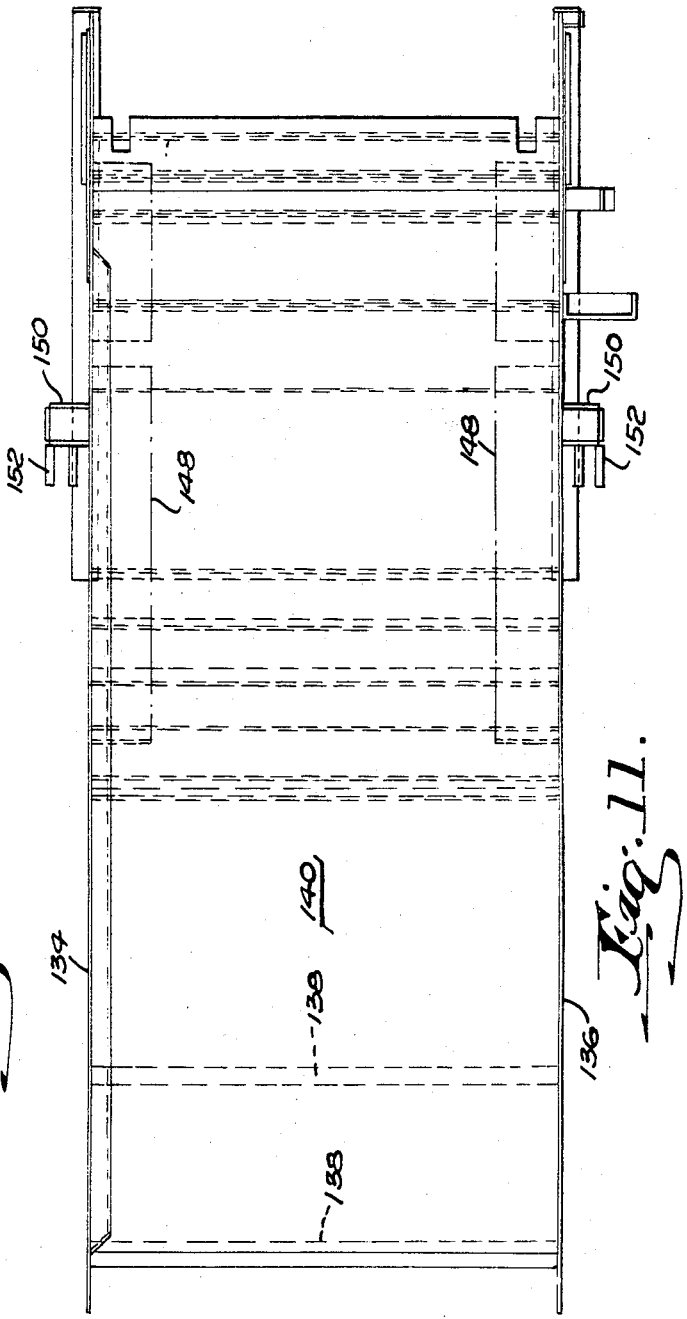

Oct. 1, 1968    A. L. LEE ETAL    3,403,797
FLEXIBLE SHUTTLE CAR
Filed Oct. 11, 1965    8 Sheets-Sheet 2

INVENTORS.
ARTHUR L. LEE,
ARTHUR B. COVAL
BY Stanley J. Price
their
ATTORNEY.

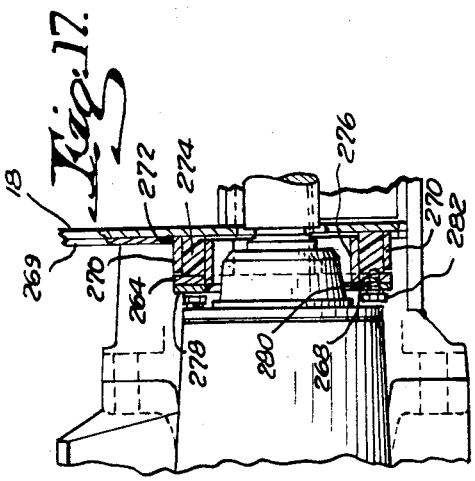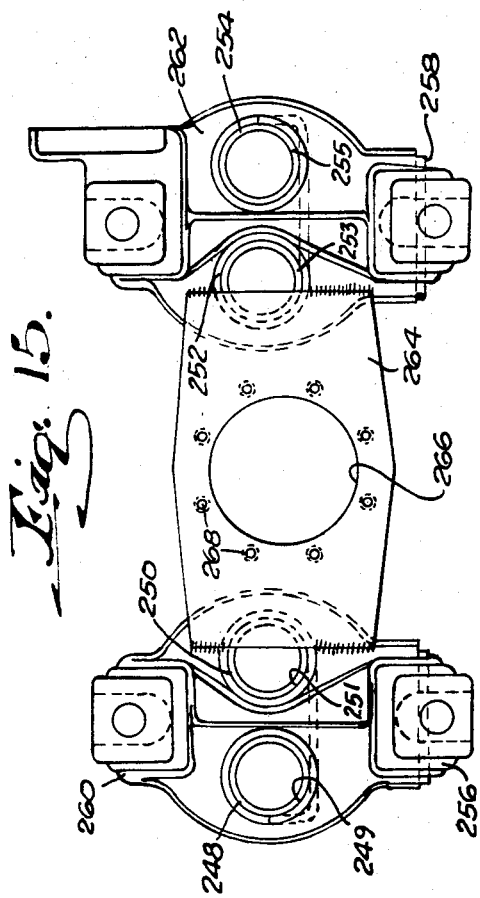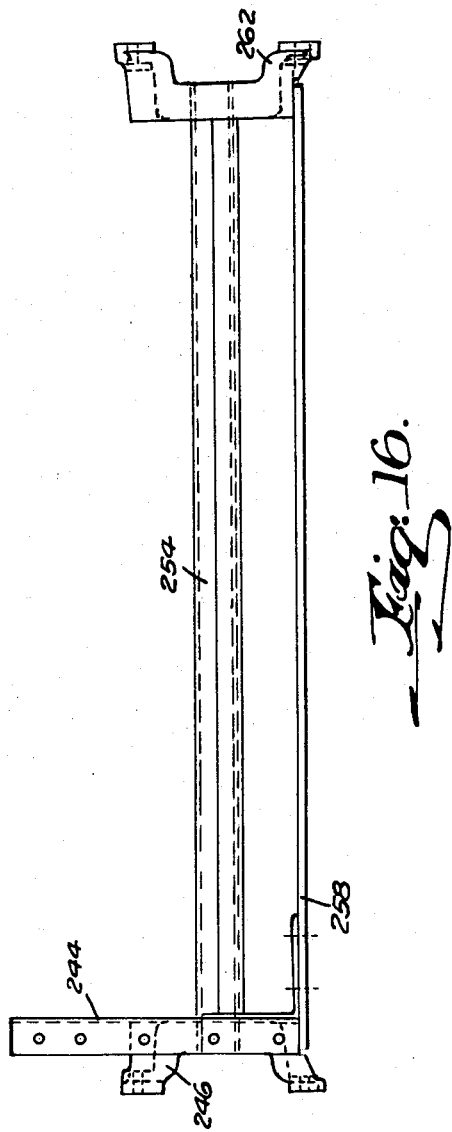

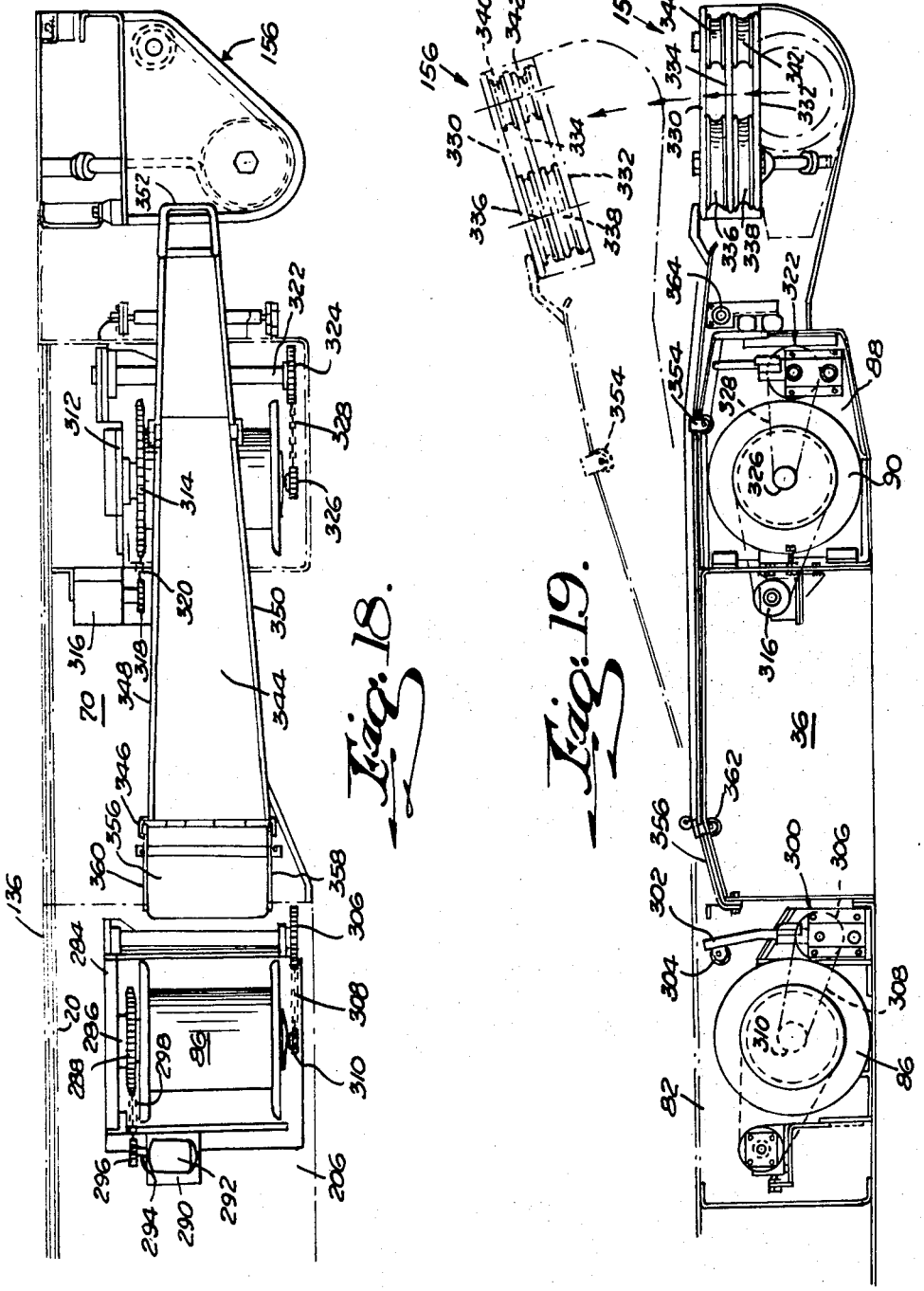

United States Patent Office 3,403,797
Patented Oct. 1, 1968

3,403,797
FLEXIBLE SHUTTLE CAR
Arthur L. Lee and Arthur B. Coval, Columbus, Ohio, assignors to Consolidation Coal Company, Pittsburgh, Pa., a corporation of Pennsylvania
Filed Oct. 11, 1965, Ser. No. 494,783
11 Claims. (Cl. 214—83.36)

ABSTRACT OF THE DISCLOSURE

A haulage vehicle having a flexible body mounted on a pair of relatively rigid axle assemblies. The flexible body has a pair of vertical side plates forming the side walls of an elongated trough shaped material haulage compartment. A deck plate is supported by the flexible side plates and forms a bottom wall for the haulage compartment. The relatively rigid axle assemblies are connected to the side plates adjacent the end portions of the side plates so that the side plates remain free to flex when the haulage vehicle is subjected to torsional stresses. The axle assemblies have pairs of driven and steerable wheels mounted thereon for supporting the flexible body and propelling the vehicle.

---

This invention relates to a haulage vehicle for hauling loose material in underground mines, and more particularly to a relatively flexible haulage vehicle that follows the contours and undulations of uneven mine floors.

The conventional shuttle car has a rigid body with a material haulage compartment extending lengthwise thereof. A pair of driven and steerable wheels are connected to the rigid body adjacent one end, and the other pair of driven and steerable wheels are connected to an equalizer axle that extends transversely beneath the body adjacent the other end. The equalizer axle is pivotally connected to the body on the longitudinal axis of the vehicle. The pivotally secured axle provides a three point suspension for the vehicle and permits limited vertical movement of the propelling wheels connected thereto. The principal function of the equalizer axle is to reduce the torsional or twisting forces exerted on the rigid body as the haulage vehicle travels over uneven surfaces. The vertical movement of the propelling wheels connected to the equalizer axle is, however, limited by the space limitations of the vehicle. Where conditions of relatively severe undulations exist in the mine floor, the conventional shuttle car with the rigid body loses a portion of its tractive effort due to the inability of the propelling wheels to follow the irregular contours of the mine floor. There is a need for a haulage vehicle that has a flexible body capable of following relatively severe undulations in the mine floor so that all four wheels retain substantially the same tractive power.

United States Patent No. 3,185,325 to Stalker entitled "Shuttle Car" recognized the need for a flexible haulage vehicle capable of flexing and conforming to the undulations of an uneven mine floor. It is suggested in order to obtain the desired degree of flexibility that the side plates or body of the material haulage compartment be fabricated from a light-weight material having a relatively thin cross section. The side plates are connected to each other adjacent their lower edge portions by transversely extending channel shaped spacer beams. The relationship of the side plates and spacer beams is such that they form a torsionally unstable column with sufficient torsional instability to permit the frame to flex and follow the contours of the undulating terrain. The frame is supported by driven and steered propelling wheels having wheel housings mounted on wheel mounting brackets. The wheel mounting brackets are, in turn, connected to the outside of the side walls. With the arrangement suggested in United States Patent No. 3,185,325 the load carrying capacity of the vehicle is severely limited for the following reason.

The material haulage compartment is channel shaped with the side plates forming the vertical side walls of the haulage compartment. The wheel brackets and mounting brackets are directly connected to the thin flexible side plates of the vehicle and extend laterally therefrom. The wheel brackets and mounting brackets act as a horizontally extending lever connected at one end to the thin side plates and have the propelling wheels mounted on the other end thereof. The load carried by the haulage vehicle is supported by the four propelling wheels connected to the end portions of the horizontally extending levers. The bending moment exerted on the levers tending to bend the vehicle side plates inwardly toward the inner portion of the material haulage compartment and cant or deflect the wheels from a vertical plane is proportional to the load carried by the vehicle. It is stated in the above patent that it is necessary to fabricate the side plates of the body from a lightweight material having a relatively thin cross section to obtain the torsional instability required to permit the frame to flex. A side plate fabricated of the thin flexible material would be unable to support a substantial load without inward deflection as above discussed.

Briefly, the invention is directed to a haulage vehicle having a flexible body capable of following the contours of an undulating surface and capable of transporting substantial loads without inward deflection of the body side plates. The haulage vehicle has a flexible main body assembly with a pair of axle assemblies connected thereto. The axle assemblies have pairs of mounting brackets on opposite ends thereof connected to each other by support members extending transversely beneath the deck of the haulage compartment. Certain of the support members are compression members arranged to carry the load in the haulage compartment in compression while other of the support members are tension members arranged to carry the load in tension and maintain the propelling wheels in vertical planes under substantial load conditions in the flexible body.

Other features of the flexible haulage vehicle include a tail section assembly pivotally secured to the main body assembly that may be arranged to pivot relative to the main body assembly to control the elevation of the tail section assembly end portion. Another feature includes a pair of cable reels supported by a side plate of the flexible body in tandem and on opposite sides of an axle assembly. Where the flexible haulage vehicle is to be subjected to severe undulations and maximum flexibility is desired, one of the wheel mounting brackets of each axle assembly may be movably connected to the body side plates. With this arrangement the torsional twisting of the body is taken up in the connection and not transmitted to the axle assembly. The flexible body may thus deflect and twist relative to the axle assemblies.

It is, therefore, a primary object of this invention to provide a flexible haulage vehicle capable of conforming to relatively severe undulations in an uneven mine floor and capable of transporting substantial loads of loose material.

Anther object of this invention is to provide a flexible haulage vehicle that has axle assemblies on which the flexible body is mounted.

A still further object of this invention is to provide an axle assembly for a flexible haulage vehicle that has separate compression members and tension members through which the load in the haulage vehicle is transmitted to the propelling wheels.

A still further object of this invention is to provide a flexible haulage vehicle that has axle assemblies movably connected to the vehicle body to permit relative movement therebetween during the flexure of the vehicle body.

Another object of this invention is to provide a flexible haulage vehicle having a pair of cable reels positioned in tandem along the same side of the body.

These and other objects and advantages of the invention will be more completely disclosed and described in the following specification, the accompanying drawings and the appended claims.

In the drawings:

FIGURE 1 is a perspective view of the flexible haulage vehicle in a deflected position illustrating the flexure of the vehicle.

FIGURE 2 is a diagrammatic end view illustrating the helical or corkscrew deflection in the body between the pairs of front wheels and rear wheels.

FIGURE 3 is a top plan view of the haulage vehicle with portions of the fenders broken away illustrating portions of the axle assemblies with the wheel mounting brackets and propelling wheels mounted thereon.

FIGURE 4 is a view in side elevation of the haulage vehicle illustrated in FIGURE 3.

FIGURE 5 is a top plan view of the main body assembly with the axle assemblies connected thereto and with portions broken away to illustrate the elongated draw bolts connecting the side plates to each other.

FIGURE 6 is a view in side elevation of the main frame assembly with parts broken away to illustrate the channel shaped reinforcing members for the deck plate.

FIGURE 7 is a plan view of the tail section assembly.

FIGURE 8 is a view in side elevation of the tail section assembly illustrated in FIGURE 7.

FIGURE 9 is a view in section taken along the line 9—9 of FIGURE 7 illustrating the bumper assembly for the end portion of the tail section.

FIGURE 10 is a view in side elevation of the boom assembly.

FIGURE 11 is a view in top plan of the boom assembly illustrated in FIGURE 10.

FIGURE 15 is a view in side elevation of another embodiment of the axle assembly.

FIGURE 16 is a view in front elevation of the axle assembly illustrated in FIGURE 15.

FIGURE 17 is a fragmentary view in side elevation illustrating the manner in which one side of the axle assembly illustrated in FIGURE 15 is connected to the body side wall.

FIGURE 18 is a top plan view of the tandemly arranged cable reels.

FIGURE 19 is a view in side elevation of the tandemly arranged cable reels illustrated in FIGURE 18.

Figure 12:
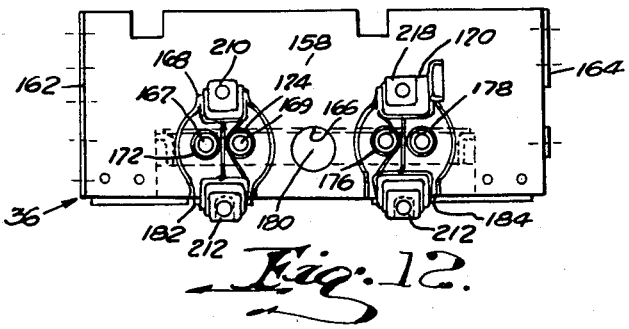
FIGURE 12 is an end view of one embodiment of the axle assembly.

Referring to the drawings there is illustrated in FIGURES 3 and 4 a flexible haulage vehicle generally designated by the numeral 10 that has a main body assembly 12, a tail section assembly 14 and a boom section 16. The main body assembly 12 is illustrated in detail in FIGURES 5 and 6, the tail section assembly is illustrated in detail in FIGURES 7 and 8, and the boom assembly is illustrated in detail in FIGURES 10 and 11.

Referring to FIGURES 5 and 6, the main body assembly 12 has a pair of vertical side plates 18 and 20 with inturned flange portions 22 and 24 on which is positioned a deck plate 26. The side plates 18 and 20 have inturned bolt pads 28, 30, 32 and 34 to which the front axle assembly 36 is secured. Similarly, the side plates 18 and 20 have inwardly extending bolt pads 38, 40, 42 and 44 to which the rear axle assembly 46 is secured. The side plates 18 and 20 each have aligned draw bolt apertures 48, 50 and 52 therethrough and inwardly extending elongated chain guides 54 and 56 that are spaced above the deck plate 26. The deck plate 26 has a plurality of channel shaped stiffening members 58 extending transversely thereacross to prevent a sag in the deck plate 26 when it supports a load in the material haulage compartment. The channel shaped members 58 rest on the inturned flanges 24 of the respective side plates 18 and 20. Draw bolts 60, 62 and 64 extend through respective apertures 48, 50 and 52 in the side plates 18 and 20 and urge the side plates 18 toward each other, and thus form a channel shaped material haulage compartment with the vertical side plates 18 and 20 forming the side walls of the channel shaped material haulage compartment and the deck plate 26 forming a portion of the bottom wall of the haulage compartment.

The draw bolt connections between the side plates 18 and 20 permit the side plates to flex vertically relative to each other about transverse axes of the haulage compartment to thus provide a flexible main body for the haulage vehicle. The axle assemblies 36 and 46, to be later described in detail, are positioned in receiving recesses 66 and 68 in the side plates 18 and 20. The axle assemblies 36 and 46 are secured to the side plates 18 and 20 by means of bolt pads on the axle assemblies mating with the bolt pads 28, 30, 32, 34, 38, 40, 42 and 44 on the respective side plates 18 and 20. Fender compartments 70 are connected to the axle assemblies 36 and 46. An angle shaped beam 71 is secured to the front of the axle assembly 36 and the fender compartments 70 and has receivers 73 for the boom actuator, later described.

The side plates 18 and 20 have aligned apertures 72 therethrough arranged to receive the pivot shaft of the boom assembly 16 and a hinge connection 74 to receive the shaft of the pivoted tail section 14. The side plates 18 and 20 have outwardly extending flanged portions 76 and 78 extending longitudinally between the axle assemblies 36 and 46. Suitable plate-like supporting means are positioned on the flanged portions 76 and 78 and are suitably secured to the respective side plates 18 and 20 and to the depending side walls of the fender compartments 70 to form, on one side of the vehicle, an operator's compartment 80 (FIGURE 3), and on the other side of the vehicle, a compartment 82 to house a transmission 84 and a cable reel 86. A compartment 88 for a second cable reel 90 is secured to the depending side wall of the fender compartment 70 on the opposite side of the axle assembly 36 to provide a pair of cable reels 86 and 90 arranged in tandem on opposite sides of the axle assembly 36 and on the same side of the vehicle. As illustrated in FIGURE 4, the side plates 18 and 20 and the plates forming the supporting means for the operator's compartment 80 and compartment 82 have inclined surfaces to provide for maximum road clearance at the center of the vehicle.

The tail section assembly 14 illustrated in FIGURES 7 and 8 has a pair of vertical side walls 92 and 94 that are connected to each other by means of a plurality of transverse connecting members 96. The side walls 92 and 94 have inturned chain guide flanges 98 that are aligned with the chain guides 54 and 56 on the main body assembly 12. Transverse channel shaped members 100 are connected to the side plates 92 and 94 and extend laterally therefrom and form support means for a drive motor 102 and an electric controller 104 (FIGURE 3). The tail section assembly 14 has a structural member 106 extending transversely thereof adjacent the rear edge portion. Plates 108 are connected to the structural member 106 and side walls 92 and 94 to form protective housings for the motor 102 and electric controller 104. A bumper 110 is connected to the structural member 106 and extends laterally beyond the side plates 92 and 94. The bumper includes segments 112 (FIGURE 9) with a cup shaped member 114 secured to the structural member 106. The cup shaped member 114 has a bolt receiving aperture 116 therein. A second cup shaped member 118 is positioned within the cup shaped member 114 and has a resilient member 120 therebetween. The second cup shaped member 118 has an aperture 122 aligned with aperture 116. A bolt 124 maintains the resilient member 120 under compression and serves to control the amount of movement between the cup shaped members 114 and 118 when the cup shaped member 118 is urged inwardly toward the cup shaped member 114. With this arrangement the bumper 110 has a resilient cushioning means to reduce the impact shock.

The tail section side walls 92 and 94 each has a link member 126 secured thereto with aperture 128 therein. The aperture 128 in link member 126 is aligned with hinge connection 74 on the main body assembly 12 and a suitable pin extends therethrough to pivotally connect the tail section 14 to the main body assembly 12. Suitable means 130, such as a hydraulic cylinder, is connected to the respective side walls 92 and 18 and 20 and 94 of the main body section 12 and tail section assembly 14 to hingedly move the tail section about the axis through the hinged connection formed by link 126. With this arrangement the tail section of the vehicle may be lowered to prevent the upper portion of the tail section from contacting the roof of the mine when the haulage vehicle is used in relatively thin seams with severe undulations. The bumper 110 has side members 132 extending forwardly therefrom and are hingedly connected to the fender compartments 70 (FIGURE 3) that protect the electric motor 102 and the electric controller 104.

Referring to FIGURES 10 and 11, the boom assembly 16 includes a pair of side plates 134 and 136 positioned in spaced parallel relation to each other with transverse beams 138 therebetween. A deck plate 140 is supported on the transverse beams 138 between side plates 134 and 136 and provides a bottom wall for the boom assembly 16. Adjacent the front end of side plates 134 and 136 there are provided journals 142 for drive sprockets 144 (FIGURE 3) which drive the chains 238 and 240 of the endless chain conveyor 146. Connected to the lower edge of side plates 134 and 136 are inwardly extending guide plates 148 for the return reach of conveyor 146.

There is secured to the outer wall of side plates 134 and 136 vertical channel shaped members 150 with rearwardly extending connecting members 152 that are pivotally connected to a hydraulic actuator 154 (FIGURE 3). The other end of the hydraulic actuator 154 is pivotally connected to the receivers 73 secured to the transverse beam 71 on the main body assembly 12 (FIGURE 5). With this arrangement extension of the hydraulic actuator 154 will pivot the boom assembly about a hinged connection formed by a pivot shaft extending through the tubular transverse beams 138 and through the aligned apertures 72 in the main body assembly side walls 18 and 20. There is provided on the outer wall of side plate 136 receivers for the cable guides 156, to be later described.

Figure 13:
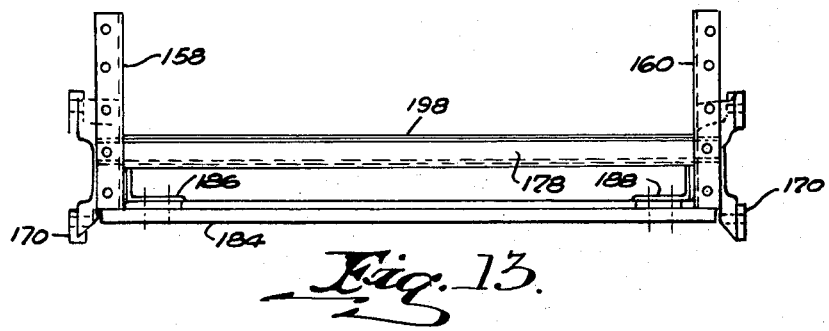
FIGURE 13 is a view in side elevation of the axle assembly illustrated in FIGURE 10.
Figure 14:
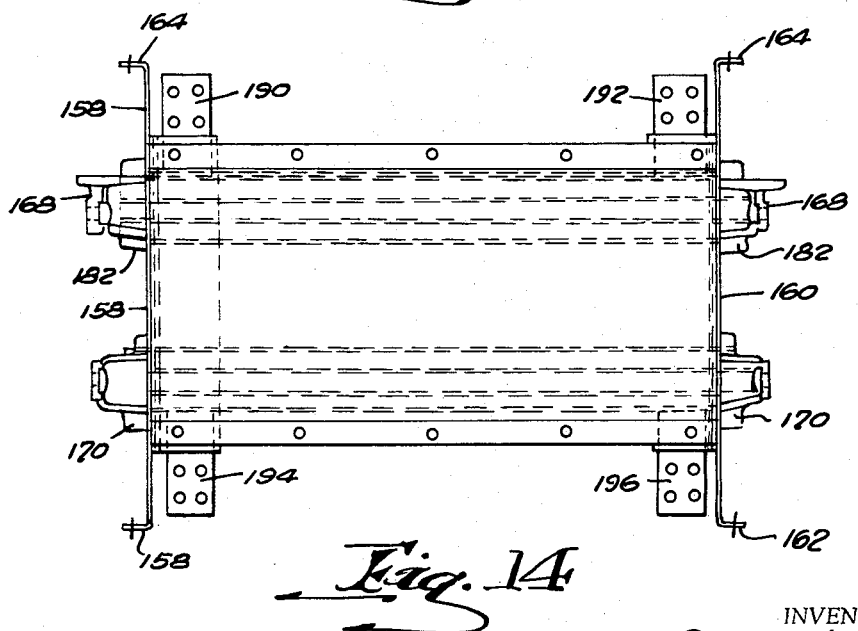
FIGURE 14 is a view in top plan of the axle assembly illustrated in FIGURES 12 and 13.

FIGURES 12, 13 and 14 illustrate one embodiment of the front axle assembly 36. It should be understood that the front axle assembly 36 and the rear axle assembly 46 are of substantially the same construction and have interchangeable parts. The axle assembly 36 has a pair of vertical side plates 158 and 160 with outturned side flanges 162 and 164. The plates 158 and 160 are positioned in spaced parallel relation with each other and each has a central drive shaft aperture 166 therethrough. A pair of axle brackets 168 and 170 are positioned on opposite sides of the aperture 166. Each of the axle brackets 168 and 170 has a pair of spaced apertures 167 and 169 therethrough. Tubular support members 172 and 174 extend transversely across the axle assembly through apertures in plates 158 and 160 and through the apertures 167 and 169 in both of the spaced axle brackets 168. The ends of the tubular supports are secured to the plates 158 and 160 and axle brackets 168 and 170 as by welding or the like. A similar pair of tubular support members 176 and 178 extend transversely across the axle assembly, through apertures in plates 156 and 160 and through the apertures 167 and 169 in both of the axle brackets 170. The tubular support members 176 and 178 are secured to the pair of spaced axle brackets 170 by welding or the like. The tubular support members 172, 174, 176 and 178 are positioned in a plane that includes the drive axis designated by the numeral 180 in FIGURE 12. The tubular support members 172, 174, 176 and 178 support the haulage vehicle 10 in compression and may be defined as compressive support members.

The pair of axle brackets 168 have a transversely extending strap-like support member 182 secured to their lower edge portion and extending transversely across the lower portion of the axle assembly 36. A similar strap-like support member 184 is secured to the axle brackets 170 positioned on the opposite side of the drive axis. The strap-like support members are arranged to support the haulage vehicle 10 in tension and may be defined as tensional support members 182 and 184. Longitudinally extending angular members 186 and 188 are secured to both the strap-like support members 182 and 184 and the vertical plates 158 and 160. Extending longitudinally from the transverse strap-like supports are bolt pads 190, 192, 194 and 196. A plate member 198 is secured to the transverse supports 172, 174, 176 and 178 above the aperture 166 and serves as a bottom wall for the portion of the haulage compartment.

The axle assemblies 36 and 46 are secured to the side plates 18 and 20 in the following manner (FIGURE 5). The axle assemblies, for example axle assembly 36, are positioned transversely of side plates 18 and 20 with the inner wall of side plates 158 and 160 abutting the outer wall of body side plates 18 and 20 with the transverse support members 172, 174, 176 and 178 positioned in the receiving recesses 66 in the side plates 18 and 20. The axle assemblies are then bolted by means of bolts 200 (FIGURE 6) extending through aligned horizontal apertures in the adjacent side plates of the body and the axle assembly. The axle assembly bolt pads 190, 192, 194 and 196 are in underlying relation with bolt pads 32, 28, 34 and 30. Bolts 202 (FIGURE 5) extend through mating apertures in the respective pads to secure the axle assemblies to the body side plates 18 and 20. Where desired, the axle assembly side plates 158 may be secured to the body side plates 18 and 20 by other suitable means such as welding or the like. It is preferred, however, to facilitate the assembly and disassembly of the vehicle, that bolts be employed to secure the various components to each other. The axle assembly 46 is secured to the side plates 18 and 20 in substantially the same manner.

Channel shaped fender compartments 70 have their vertical side walls bolted to the outwardly extending flange 164 on the respective axle assembly side plates 158 and 160. Elongated members 204 and 206 are suitably secured to the side walls of the fender compartments 70 adjacent their lower edge portions and span the distance between the axle assemblies to form the compartments 80 and 82. A portion of member 204 is supported on the outturned flange 76 of side plate 18. Similarly, an edge portion of member 206 is supported on flange 78 of side plate 20. The elongated member has an upwardly extending portion 208 (FIGURE 3) that is suitably bolted intermediate its end portions to the side plate 18. The elongated member 204 has upturned end portions that are suitably bolted to the depending sides of the adjacent fender compartments 70 to provide a three point connection for the operator's compartment 80. This arrangement permits the elongated member 204 to freely flex when the main body assembly 12 is subjected to torsional forces. The three point connection of the operator's compartment 80 does not restrict to any substantial extent the flexibility of the side plates 18 and 20, since the member 204 is connected to the fender compartment side walls which, in turn, form an extension of the relatively rigid axle assemblies 36 and 46. Thus, when the main body assembly is subjected to a twisting or torsion force, the elongated member 204 is free to pivot about the single bolt connection to the side plates 18. The elongated member 206 is also suitably connected to the fender compartment side walls in a manner that it does not restrict substantially the flexibility of side plate 20.

The axle brackets 168 and 170 each has upper and lower pads 210 and 212 to which a wheel unit 214 is secured. A wheel member 216 is mounted on each of the wheel units 214 and supports the haulage vehicle 10 (FIGURES 3 and 4). The wheel unit 214 on which the wheel 216 is mounted is constructed so that the wheel 216 is both driven and steered. The steering arms 218 are suitably connected to a steering mechanism (not shown) to provide for the desired controlled steering of all of the wheels 216, as is illustrated in FIGURE 3.

The wheels are driven from a single prime mover, i.e. electric motor 102, through a multispeed transmission 84. The drive train includes input shafting 220 connecting the electric motor 102 and the transmission 84. From the transmission 84, output shafting extends rearwardly to a differential mechanism 224 adjacent the right rear wheel unit 214. From the differential 224, transverse shafting 225 extends through apertures 166 in the axle assembly side plates and transversely beneath the haulage compartment of the vehicle to the left rear wheel unit 214. The transverse shafting 225 is suitably connected to gearing within the left rear wheel unit 214 to propel the left rear wheel 216. An output shaft from differential 224 is connected to suitable gearing in the right rear wheel unit 214 to propel the right rear wheel 216.

An output shaft 226 extends forwardly from the transmission 84 and is connected to a front differential 228 adjacent the right front wheel unit 214. Similar transverse shafting 230 extends across the haulage compartment to the left front wheel unit 214 to provide drive for left front wheel 216 and gearing within the right front wheel unit 214 is connected to the differential 228 by suitable shafting. With this arrangement, all four wheels 216 are propelled from a single propelling means, i.e. electric motor 102. The motor 102 is, as previously described, supported on the external portion of the tail section 14 and the transmission is supported within compartment 82 on the main body section 12. There is also provided forwardly extending shafting 232 connecting an output of the transmission 84 with a drive means 234 for the drive sprockets 144 of the endless chain conveyor 146.

An endless chain type conveyor generally designated by the numeral 146 has a pair of endless chains 238 and 240 reeved about spaced drive sprockets 144 journaled in the end portion of the boom 16 and about other spaced sprockets 236 suitably supported in tail section 14. The pair of chains 238 and 240 have spaced flights 242 extending transversely therebetween and are arranged to convey the load of loose material within the haulage compartment. The chains 238 and 240 extend beneath the laterally extending guides 54 and 56 on the side plates of the main body assembly 12 and the laterally extending guides 98 on the tail section 14.

The conveyor 146 is arranged to load material into and discharge material from the elongated trough shaped compartment formed by the spaced vertical side plates and decking in the main assembly 12, tail section 14 and boom assembly 16. As previously discussed, the hydraulic actuator 154 is arranged to elevate the boom to discharge the material in the haulage compartment onto an elevated receiver such as an endless conveyor belt or the like.

In FIGURES 15, 16, and 17 there is disclosed another embodiment of an axle assembly suitable for use with the haulage vehicle previously described. The axle assembly illustrated in FIGURES 15, 16 and 17 has a vertical plate 244 similar to the vertical plate 158 and a pair of spaced axle brackets 246 similar to the axle brackets 168 and 170. Extending transversely in the same horizontal plane as the drive shaft axis and on opposite sides therof are pairs of support members 248, 250, 252 and 254 which are similar to the support members 172, 174, 176 and 178, as previously described. The support members 248, 250, 252 and 254 extend through apertures in the plate 244 and apertures in the axle brackets 246 and are secured to the axle brackets 246 and plate 244 by welding or the like. The support members 248, 250, 252 and 254 are arranged to support the haulage vehicle in compression, as has been previously described. A pair of strap-like support members 256 and 258 are secured to the lower portions of the spaced axle brackets 246 and support the haulage vehicle in tension. The arrangement of the side plate 244, axle brackets 246 and support members 248, 250, 252, 254, 256 and 258 on one side of the axle assembly illustrated in FIGURES 15, 16 and 17 is substantially the same as one side of the axle assembly illustrated in FIGURES 12, 13 and 14.

On the opposite side of the axle assembly illustrated in FIGURES 15, 16 and 17 a pair of axle brackets 260 and 262 (FIGURE 15) are secured to each other in spaced relation by means of a plate 264 suitably welded to the front face of the axle brackets 260 and 262. The plate 264 has a drive shaft aperture 266 therethrough with a plurality of threaded bolt apertures 268 extending therearound. The tubular support members 248 and 250 extend through apertures 249 and 251 in axle bracket 260 and are secured thereto as by welding or the like. Similarly, the tubular supports 252 and 254 extend through apertures 253 and 255 in axle bracket 262 and are welded thereto. The strap-like supports 256 and 258 are secured to the lower portions of the respective axle brackets 260 and 262.

The side plate 18 of the main body assembly 12 has a plate 269, similar to the plate 244, suitably secured thereto to provide the flange connecting means for the fender compartment 70. The side plate 18 also has a cylindrical receiver 270 secured thereto as by the weld 272. An annular rubber member 274 is positioned within the cylindrical receiver 270 and the axle assembly plate 264 is positioned in overlying relation therewith. A cylindrical support 276 having a radially extending annular flange 278 is positioned with the cylindrical support 276 extending through the drive shaft aperture 266 into overlying relation with the inner peripheral surface of the annular resilient member 274. The radially extending annular flange 278 is positioned in overlying relation with the outer surface of plate 264. The radially extending flange 278 has bolt receiving apertures 280 therethrough which are aligned with the threaded apertures 268 in the plate 264. Bolts 282 extend through the aligned apertures 280 and 268 and secure the support member 276 to the plate 264. With this arrangement, the axle assembly is rotatably connected to the side plate 18 to permit the side plate 18 to flex or rotate relative thereto when the body assembly 12 is subjected to torsional stresses. If desired, both axle assemblies 36 and 46 may have the modifications of the embodiment illustrated in FIGURES 15, 16 and 17.

The arrangement of the tandem cable reels 86 and 90 is illustrated in detail in FIGURES 18 and 19. The cable reel 86 is supported in compartment 82 on a support member 284 that provides for axial rotation of cable reel 86 about an axis extendng transversely relative to the longitudinal axis of the haulage vehicle. The cable reel 86 is rotatably mounted on spindle 286 and has a sprocket 288 rotatably secured thereto and rotatable therewith. The support 284 has a flange portion 290 on which a hydraulic drive motor 292 is positioned. The hydraulic motor 292 has shaft 294 extending therefrom with a sprocket 296 connected thereto. An endless chain 298 extends around the sprockets 296 and 288 and provides, through hydraulic motor 292, a drive means for rotating the cable reel 86.

A spooling assembly 300 is supported in front of cable reel 86 in parallel relation thereto and has an upwardly extending arm 302 with a guide pully 304 connected to the end portion thereof. The spooling assembly 300 has a sprocket 306 connected thereto and rotatable therewith. The sprocket 306 is connected by means of an endless chain 308 to a sprocket 310 secured to the cable reel 86. With this arrangement, the arm 302 moves transversely across a spindle of the assembly 300 in timed relation with the rotation of cable reel 86 to provide a means for spooling the cable on cable reel 86. A second cable reel 90 is positioned in compartment 88 on the opposite side of the fender compartment 70 on the same side of the haulage vehicle as cable reel 86. The cable reel 90 is supported by a suitable supporting mechanism 312 that is secured to the bottom wall and side walls of compartment 88. Sprocket 314 is connected to the cable reel for rotation therewith. A hydraulic motor 316 has a drive sprocket 318 that is connected to the sprocket 314 by means of an endless chain 320, and the hydraulic motor 316 thus provides drive for the cable reel 90. A spooling device 322 is positioned in front of the cable reel 90 and has a sprocket 324 connected thereto. The sprocket 324 is connected to sprocket 326 on cable reel 90 by an endless chain 328. With this arrangement, the spooling mechanism 322 rotates in timed relation with the cable reel 90 to spool the cable onto the cable reel 90.

Cable guides generally designated by the numeral 156 are supported on the boom side plate 136 and extend laterally therefrom. The cable guides include an upper plate 330, a lower plate 332 and an intermediate plate 334. Pairs of guide sheaves or rollers 336 and 338 are positioned between the spaced plates 330 and 332 with the intermediate plate 334 therebetween. The sheaves 336 and 338 are axially aligned and the upper spool 336 is arranged to guide the cable wound on the rear cable reel 86, and the lower spool 338 is arranged to guide the cable wound on the front cable reel 90. A second pair of spools 340 and 342 are mounted forwardly of the spools 336 and 338. The upper spool 340 is arranged to guide the cable wound on the rear cable reel 86 and the lower spool 342 is arranged to guide the cable reel wound on the front cable reel 90.

An elongated guide plate 344 for guiding the cable wound on reel 86 is hingedly connected at 346 to the fender compartment 70 (FIGURE 18). The elongated plate 344 has depending longitudinal flanges 348 and 350 and an end support 352. A transverse guide 354 extends beneath the plate 344 intermediate its end portions and is arranged to support the cable extending forwardly from the cable reel 86. Rearwardly of the hinged connection 346 there is an inclined guide plate 356 having depending flange side walls 358 and 360 that are aligned with the depending flange wall 348 and 350 of member 344. With this arrangement between the depending flange side walls, there is formed an elongated passageway from the rear cable reel compartment 82 to the cable guide 156. A second transverse guide 362 is positioned transversely beneath the inclined guide plate 356 and is arranged to support the cable extending forwardly from cable reel 86. The guides 354 and 362 maintain the cable above the fender compartment 70 and above the front cable reel compartment 88. A roller support 364 extends transversely in front of the front cable reel compartment 88 and is arranged to support the cable wound on rear cable reel 86. The cable wound on cable reel 90 extends over the spooler 322 and is guided by the lower guides 338 and 342 on the cable guide 156.

With the above described arrangement of tandem cable reels 86 and 90, it is now possible to use a substantially longer single conductor cable on the haulage vehicle. The hinged connection of the elongated guide plate 344 permits the guide plate to pivot upwardly with the boom, as is illustrated in phantom lines in FIGURE 19, so that the cable wound on cable reel 86 remains in spaced relation with the cable wound on reel 90 in all positions of the boom assembly 16.

The haulage vehicle previously described comprises generally a main body assembly 12 with a tail section assembly 14 pivotally secured thereto. The body assembly 12, tail section assembly 14 and boom 16 have vertical spaced side plates and a transversely extending deck plate therebetween that forms an elongated trough shaped haulage compartment for the vehicle 10. An endless conveyor 146 is provided that extends throughout the entire length of the trough shaped haulage compartment and is arranged to load material into and discharge material from the elongated haulage compartment.

The trough shaped compartment of the main body assembly 12 between the axle assemblies 36 and 46 is flexible and deflects when the haulage vehicle is subjected to torsion or twisting forces because of undulations or uneven terrain, as is illustrated in FIGURE 1. The axle assemblies 36 and 46 are of rugged construction and are relatively rigid when compared with the trough shaped haulage compartment therebetween. The axle assemblies do not deflect to any substantial extent and remain substantially linear along the drive axis of the axle assemblies as the body assembly comprising the side plates 18 and deck plate 26 are twisted or deflected by torsional loads to which the haulage vehicle is subjected while traveling over uneven terrain. The distortion of the vehicle due to the torsional stresses is about the longitudinal axis of the vehicle that extends longitudinally through the center of the haulage compartment. With this arrangement, the relatively rigid axle assemblies are free to pivot about the longitudinal axis of the haulage vehicle, as is illustrated in FIGURE 2, and the side plates 18 and 20 of the haulage vehicle flex or twist and thereby permit the pivoting action of the axle assemblies.

FIGURES 1 and 2 clearly illustrate the manner in which the haulage vehicle flexes as it travels over uneven terrain. For example, in FIGURE 1 the right front wheel designated by the letter A is in an elevated plane relative to the left front wheel B. The front axle assembly diagrammatically illustrated and designated by the letter C is in an inclined plane and is pivoted relative to the longitudinal axis of the vehicle. The rear left wheel generally designated D is in an elevated plane relative to the right rear wheel E. The rear axle assembly is also pivoted about the longitudinal axis of the vehicle. The main body assembly between the front axle assembly C and the rear axle assembly F is subjected to a torsion or twisting force because of the angular relation between the axes of the axle assemblies C and F. The flexibility of the side plates 18 and 20 and the deck plate 26 permits the haulage vehicle between the axle assemblies to twist under these torsional forces to maintain the propelling wheels in contact with the ground while the vehicle passes over uneven terrain.

The side plates 18 and 20 of the main body assembly are preferably fabricated from a relatively thin flexible metal such as high strength low alloy steel plates sold by United States Steel Company under the trademark "T–1" steel. It should be understood, however, that other types of flexible, relatively thin metal having high strengths may be employed in fabricating the side plates 18 and 20. The other plate-like members of the haulage vehicle may also be fabricated from a relatively thin, flexible, high strength steel. The thin flexible metal reduces the tare weight of the vehicle and provides a vehicle having a greater haulage capacity when compared with a conventional haulage vehicle having a heavy, rigid haulage compartment.

Where it is desired to increase the flexibility of the haulage vehicle for severe undulation in the terrain, the embodiment of the axle asemblies illustrated in FIGURES 15, 16 and 17 may be used. The rotatable connection between one side of the axle assembly and the side plate of the haulage vehicle frees certain of the axle brackets for movement relative to the adjacent side plate and permits relative movement between the axle assembly and the body side plate. The axle assembly, when pivoting as illustrated in FIGURE 2, is free to rotate relative to the side plate 18 and thereby provide a greater degree of flexibility in the body of the haulage vehicle.

According to the provisions of the patent statutes, we have explained the principle, preferred construction and mode of operation of our invention and have illustrated and described what we now consider to represent its best embodiments. However, we desire to have it understood that, within the scope of the appended claims, the invention may be practiced otherwise than as specifically illustrated and described.

We claim:

1. In a haulage vehicle the combination comprising an elongated flexible body having a pair of spaced vertical side plates forming the side walls of an elongated trough shaped material haulage compartment, said side plates fabricated from a relatively thin flexible metal,
a deck plate positioned between and supported by said side plates adjacent the lower edges of said side plates and forming a bottom wall for said haulage compartment,
a pair of relatively rigid axle assemblies extending transversely beneath said spaced side plates in spaced relation to each other,
said axle assemblies connected to said side plates adjacent said side plate end portions so that said side plates between said axle assemblies remain free to flex when said haulage vehicle is subjected to torsional stresses,
at least one of said axle assemblies is rigidly connected to one of said side plates and movably connected to said other side plate, said movable connection between said axle assembly and said side plate permitting relative movement therebetween when said haulage vehicle is subjected to torsional stresses, and
each of said axle assemblies having pairs of driven and steerable wheels mounted thereon for supporting said flexible body and propelling said vehicle.

2. In a haulage vehicle the combination comprising an elongated flexible body having a pair of spaced vertical side plates forming the side walls of an elongated trough shaped material haulage compartment, said side plates fabricated from a relatively thin flexible metal,
a deck plate positioned between and supported by said side plates adjacent the lower edges of said side plates and forming a bottom wall for said haulage compartment,
a pair of relatively rigid axle assemblies extending transversely beneath said spaced side plates in spaced relation to each other,
said axle assemblies connected to said side plates adjacent said side plate end portions so that said side plates between said axle assemblies remain free to flex when said haulage vehicle is subjected to torsional stresses,
a cylindrical receiver secured to a side plate and extending laterally therefrom,
an axle assembly having a support with a cylindrical lip portion positioned within said cylindrical receiver to support said side plate on said axle assembly and permit axial movement of said cylindrical receiver relative to said cylindrical lip portion when said haulage vehicle is subjected to torsional stresses, and
each of said axle assemblies having pairs of driven and steerable wheels mounted thereon for supporting said flexible body and propelling said vehicle.

3. In a haulage vehicle the combination comprising, an elongated flexible body having a main body assembly, a tail section and a boom section,
said main body assembly having a pair of spaced vertical side plates connected adjacent their end portions to a pair of transversely extending rigid axle assemblies, a deck plate positioned between and supported by said side plates, said side plates fabricated from a thin flexible metal so that said main body assembly between said axle assemblies flexes when said haulage vehicle is subjected to torsional forces,
a tail section having a pair of vertical side plates secured to said main body assembly side plates adjacent one end thereof and a deck plate positioned between and supported by said tail section side plates,
a boom section having vertical side plates hingedly secured to said main body assembly side plates adjacent the other end thereof and a deck plate positioned between and supported by said boom section side plates,
all of said side plates forming the side walls of an elongated trough shaped haulage compartment,
said deck plates forming a bottom wall for said haulage compartment,
endless conveying means extending along said bottom wall for movement relative thereto for loading material into and discharging material from said haulage compartment,
wheels mounted on said axle assemblies for supporting and propelling said vehicle, and
a pair of cable reels supported on said flexible body on the same side and externally of said trough shaped haulage compartment, said cable reels positioned in tandem on opposite sides of an axle assembly.

4. In a main body assembly of a haulage vehicle the combination comprising,
a pair of spaced vertical side plates forming the side walls of an elongated trough shaped material haulage compartment, said side plates having longitudinally extending inturned flange portions adjacent the side plate lower edge portion, a plurality of aligned bolt receiving apertures therethrough, and a pair of aligned recessed portions in said lower edge portion adjacent the ends of said side plates,
a deck plate positioned between said side plates and supported on said inturned flange portions, said deck plate forming a bottom wall for said haulage compartment,
elongated bolt members extending through said bolt receiving apertures transversely across said haulage compartment and beneath said deck plate, said bolt members preventing lateral movement of said side plates away from each other under conditions of load in said trough shaped haulage compartment and permitting flexure of said side plates when said body assembly is subjected to torsional stresses,
a pair of rigid axle assemblies extending transversely beneath said spaced side plates adjacent the end portions of said side plates, said axle assemblies positioned in receiving recesses in said side plate lower edge portions, said axle assemblies secured to said side plates so that said side plates between said axle assemblies remain free to flex when said main body assembly is subjected to torsional stresses,
driven and steerable wheels mounted on said axle assemblies for supporting said main body assembly, and
said axle assemblies having transversely extending support members on opposite sides of the drive axis of said wheels, certain of said support members arranged to be under compression when supporting said main body assembly, other of said support members arranged to be under tension when supporting said main body assembly.

5. In a main body assembly of a haulage vehicle the combination comprising,
a pair of spaced vertical side plates forming the side walls of an elongated trough shaped material haulage compartment, said side plates having longitudinally extending inturned flange portions and longitudinally extending outturned flange portions adjacent the side plate lower edge portion and a plurality of inturned support pads adjacent the plate end portions and adjacent said plate lower edge portions,
a deck plate positioned between said side plates and supported on said inturned flange portions, said deck plate forming a bottom wall for said haulage compartment,
a pair of rigid axle assemblies having a plurality of longitudinally extending support pads secured to laterally extending wheel mounting brackets, transversely extending support members secured to said wheel mounting brackets,
said rigid axle assemblies positioned transversely beneath said spaced side plates adjacent the end portions of said side plates with said axle assembly support pads secured to said side plate support pads so that said side plates between said axle assemblies remain free to flex when said main body assembly is subjected to torsional stresses,
said axle assemblies having fender compartments extending laterally therefrom and enclosing said wheel mounting brackets, and
support members connected to said fender compartments and extending between said pair of wheel assemblies, said support members supported on said side plate outturned flange portions and forming compartments on said main assembly located outside of said haulage compartment, said support members so connected to said fender compartments that said side plates flex when said body assembly is subjected to torsional stresses.

6. In a main body assembly as set forth in claim 4 in which said axle assemblies include transverse plate members positioned in the same horizontal plane as said deck plate and forming with said deck plate a bottom wall for said haulage compartment.

7. In a main body assembly as set forth in claim 5 in which,
said axle assemblies each include a pair of spaced vertical plates each of said vertical plates secured to an adjacent wheel mounting bracket,
the inner surface of said vertical plates abutting the outer surface of said adjacent side plates, and
means securing said vertical plate to said adjacent side plate.

8. In a main body assembly of a haulage vehicle the combination comprising,
a pair of spaced vertical side plates forming the side walls of an elongated trough shaped material haulage compartment, said side plates having longitudinally extending inturned flange portions adjacent the side plate lower edge portion,
a deck plate positioned between said side plates and supported on said inturned flange portions, said deck plate forming a bottom wall for said haulage compartment,
a pair of rigid axle assemblies each having a pair of wheel mounting brackets, transversely extending support members secured to said wheel mounting brackets.
said rigid axle assemblies positioned transversely beneath said spaced side plates adjacent the end portions of said side plates, one of said pair of wheel mounting brackets secured to said adjacent side plate, said side plate adjacent said other wheel mounting bracket having a cylindrical receiver member extending laterally therefrom, said wheel mounting brackets having an annular support member extending laterally therefrom, said annular support member positioned within said cylindrical receiver secured to said side plate, an annular resilient member positioned between said cylindrical receiver and said annular support member to thereby support said wheel mounting brackets from said side plate and permit said wheel mounting brackets to rotate relative to said adjacent side plate as said side plate flexes under torsional stresses on said main body.

9. In a haulage vehicle the combination comprising,
an elongated flexible body having a pair of spaced vertical side plates forming the side walls of an elongated trough shaped material haulage compartment, said side plates fabricated from a relatively thin flexible metal,
a deck plate positioned between and supported by said side plates adjacent the lower edges of said side plates and forming a bottom wall for said haulage compartment,
a pair of relatively rigid axle assemblies extending transversely beneath said spaced side plates in spaced relation to each other, said axle assemblies connected to said side plates adjacent said side plate end portions so that said side plates between said axle assemblies remain free to flex when said haulage vehicle is subjected to torsional stresses,
each of said axle assemblies having pairs of driven and steerable wheels mounted thereon for supporting said flexible body and propelling said vehicle,
an electric motor mounted on said haulage vehicle externally of said haulage compartment,
a first cable reel mounted on the side of said haulage vehicle between said axle assemblies,
support means for said cable reel, said support means carried by said relatively rigid axle assembly,
a second cable reel mounted on the side of said haulage vehicle in tandem relation with said first cable reel and longitudinally spaced therefrom with an axle assembly therebetween,
support means for said second cable reel, said support means carried by the same rigid axle assembly as said first cable reel, and
both of said cable reels arranged to have single conductor cables wound thereon for supplying current to said electric motor.

10. In a haulage vehicle the combination comprising,
an elongated flexible body having a pair of spaced vertical side plates forming the side walls of an elongated trough shaped material haulage compartment, said side plates fabricated from a relatively thin flexible metal,
a deck plate positioned between and supported by said side plates adjacent the lower edges of said side plates and forming a bottom wall for said haulage compartment,
a pair of relatively rigid axle assemblies extending transversely beneath said spaced side plates in spaced relation to each other, said axle assemblies connected to said side plates adjacent said side plate end portions so that said side plates between said axle assemblies remain free to flex when said haulage vehicle is subjected to torsional stresses,
each of said axle assemblies having pairs of driven and steerable wheels mounted thereon for supporting said flexible body and propelling said vehicle,
each of said axle assemblies including fender compartments extending laterally therefrom over said wheels mounted thereon,
a plate-like support member positioned between said axle assemblies on one side of said vehicle and forming a longitudinal compartment externally of said haulage compartment on one side thereof, said plate-like support member secured to said adjacent fender compartments,
a first cable reel mounted on the side of said haulage vehicle in said longitudinal compartment between said axle assemblies, support means for said cable reel positioned on said plate-like support member, said cable reel positioned below the upper horizontal portion of said adjacent fender compartment,
a second cable reel mounted on the side of said haulage vehicle in tandem relation with said first cable reel and longitudinally spaced therefrom with said axle assembly therebetween, support means for said second cable reel carried by the fender compartment of said adjacent axle assembly, said second cable reel positioned below the upper horizontal portion of said adjacent fender compartment, an electric motor mounted on the side of said haulage vehicle externally of said haulage compartment, both of said cable reels arranged to have single conductor cables wound thereon for supplying current to said electric motor, guide sheaves secured to the front end of said vehicle, and guide means to guide the cable between the guide sheaves and the cable reels and maintain said cables in spaced relation to each other.

11. In a haulage vehicle the combination comprising, an elongated flexible body having a main body assembly, a tail section and a boom section, said main body assembly having a pair of spaced vertical side plates connected adjacent their end portions to a pair of transversely extending relatively rigid axle assemblies, a deck plate positioned between and supported by said side plates, said side plates fabricated from a thin flexible metal so that said main body assembly between said axle assemblies flexes when said haulage vehicle is subjected to torsion forces, a tail section having a pair of vertical side plates secured to said main body assembly side plates adjacent one end thereof and a deck plate positioned between and supported by said tail section side plates, a boom section having vertical side plates hingedly secured to said main body assembly side plates adjacent the other end thereof and a deck plate positioned between and supported by said boom section side plates, all of said side plates forming the side walls of an elongated trough shaped haulage compartment, said deck plates forming a bottom wall for said haulage compartment, an endless conveying means extending along said bottom wall for movement relative thereto for loading material into and discharging material from said haulage compartment, hinge means connected to said main body side plates to pivot and elevate said boom section relative to said main body assembly, said transversely extending rigid axle assemblies positioned beneath said main body assembly spaced side plates adjacent the end portions of said side plates and having laterally extending wheel mounting brackets, transversely extending support members secured to said wheel mounting brackets, certain of said supporting members aranged to support said haulage vehicle in compression and other of said support members arranged to support said haulage vehicle in tension, said laterally extending wheel mounting bracket having driven and steered wheels mounted thereon for supporting said haulage vehicle and propelling said vehicle, said axle assemblies each having fender compartments extending laterally therefrom and enclosing said wheel mounting brackets and wheels mounted thereon, support members connected to said fender compartments and extending between said pair of wheel assemblies, said support members so connected to said fender compartments that said side plates of said main body assembly are free to flex when said haulage vehicle is subjected to torsional stresses, an electric motor mounted on said tail section externally of said haulage compartment, said electric motor arranged through driving connections to propel said wheels on said haulage vehicle, a first cable reel mounted on the side of said main body assembly between said pair of axle assemblies, support means for said cable reel carried by a portion of the fender compartment of an axle assembly, a second cable reel mounted on the side of the haulage vehicle in tandem relation with said first cable reel and longitudinally spaced therefrom with an axle assembly therebetween, guide sheaves secured to the front end of said boom section, guide means to guide the cable between the guide sheaves and the cable reels and maintain said cables in spaced relation to each other.

both of said cable reels arranged to have single conductor cables wound thereon for supplying current to said electric motor, and said side plates of said main body assembly fabricated from a relatively thin flexible metal so that said side plates between said axle assemblies flex when said haulage vehicle is subjected to torsional stresses.

References Cited

UNITED STATES PATENTS

| | | | |
|---|---|---|---|
| 2,325,731 | 8/1943 | Arentzen et al. | 214—83.36 |
| 3,154,163 | 10/1964 | Hagenbook | 214—83.36 X |
| 3,185,324 | 5/1965 | Breithaupt et al. | 214—83.36 |
| 3,185,325 | 5/1965 | Stalker et al. | 214—83.36 |

ALBERT J. MAKAY, *Primary Examiner*